United States Patent [19]

Dehais

[11] Patent Number: 5,690,135
[45] Date of Patent: Nov. 25, 1997

[54] DIVERTER VALVE WITH SHUTOFF FEATURE

[75] Inventor: John M. Dehais, Windsor, Conn.

[73] Assignee: United Technologies Corporation, Windsor Locks, Conn.

[21] Appl. No.: 597,672

[22] Filed: Feb. 6, 1996

[51] Int. Cl.⁶ .................................................. F16K 17/38
[52] U.S. Cl. ..................... 137/79; 137/625.47; 137/876; 137/887; 62/401; 165/42
[58] Field of Search ................................. 137/876, 887, 137/625.47, 79, 80, 334; 251/174; 165/42; 62/401

[56] References Cited

U.S. PATENT DOCUMENTS

| | | | |
|---|---|---|---|
| 641,673 | 1/1900 | Bachmeyer | 137/887 |
| 976,460 | 8/1910 | Straub . | |
| 1,055,657 | 3/1913 | Roessler et al. . | |
| 1,857,279 | 5/1932 | Herthel et al. . | |
| 2,016,577 | 10/1935 | Pearson . | |
| 2,110,557 | 3/1938 | Seifer . | |
| 2,551,697 | 5/1951 | Palmatier | 165/42 |
| 2,698,731 | 1/1955 | Koehler et al. | 251/174 |
| 3,080,728 | 3/1963 | Groves et al. | 62/401 |
| 3,118,650 | 1/1964 | Cooper et al. | 251/174 |
| 3,753,462 | 8/1973 | Burger | 165/42 |
| 4,177,832 | 12/1979 | Price | 137/625.47 |
| 4,264,244 | 4/1981 | Steele | 137/876 |
| 4,462,372 | 7/1984 | Jackson | 137/625.47 |
| 4,909,273 | 3/1990 | Heep et al. | 137/625.47 |
| 5,072,758 | 12/1991 | Krambrock . | |
| 5,188,149 | 2/1993 | Williams . | |

FOREIGN PATENT DOCUMENTS

| | | | |
|---|---|---|---|
| 347859 | 5/1905 | France | 137/876 |
| 251662 | 10/1912 | Germany | 137/876 |
| 1146372 | 3/1963 | Germany | 62/401 |

*Primary Examiner*—A. Michael Chambers

[57] ABSTRACT

A diverter valve with a shutoff feature for usage in an aircraft environmental control system is disclosed. The valve has a housing that includes an inlet connected with a source of air, and first and second outlets spaced 90° apart. The first outlet is connected with the ECS refrigeration pack, while the second outlet, which is at a 90° angle with respect to both the inlet and the first outlet, is connected with a bypass line that bypasses the refrigeration pack and is connected with a heater inside the ECS. A gate internal to the valve housing is rotatable over a 90° range of motion to connect the air from the source to either solely the first outlet, to both the first and second outlets, to solely the second outlet, or to neither the first nor second outlets, depending upon a desired temperature of the air provided to the cockpit or cabin of the aircraft.

15 Claims, 3 Drawing Sheets

DIVERTER VALVE WITH SHUTOFF FEATURE

BACKGROUND OF THE INVENTION

This invention relates to valves, and more particularly to a diverter valve that selectively connects an input fluid flow to none, one or both outputs of the valve, depending upon the rotational position of an internal gate within the valve.

In the art of environmental control systems ("ECSs") for controlling air quality characteristics of air provided to the cockpit and passenger cabin of an aircraft, it is known to use air supplied by a source such as an auxiliary or secondary power unit. The source air may then be controllably routed to a refrigeration pack for cooling. If heating of the air is desired, a portion or all of the source air is controllably routed around the refrigeration pack in a bypass line to a heater. The heated air may then be mixed with the cooled air to achieve conditioned air of a desired temperature.

In the prior art of aircraft temperature control systems described above, it is known to use dual valves to accomplish the appropriate routing of the source air between the heater and the refrigeration pack. For example, it is known to use two butterfly valves powered by a single actuator, either electric or pneumatic. The valves are linked to the actuator through a linkage mechanism. The desired temperature schedule of valve area versus actuator angle is typically obtained through design of a mechanical linkage. However, the linkage design tends to be somewhat complicated, and the mechanical linkage tends to wear over time. Also, no means is typically provided with such design to selectively shut off the air flow entirely from the source to both the refrigeration pack and the heater at the same time. An additional shutoff valve placed upstream of the dual valve may be used to shut off the air flow.

Accordingly, it is a primary object of the present invention to overcome the shortcomings of the prior art and to provide a single valve that can selectively divert the source air between the refrigeration pack and/or the heater, and selectively shut off the source air entirely from entering both the refrigeration pack and the heater.

It is a general object of the present invention to provide a single diverter valve that eliminates the need for complex mechanical linkages that wear out over time.

It is another object of the present invention to provide the single diverter valve that is more reliable than prior art, dual valve designs.

It is yet another object of the present invention to provide the single diverter valve that is smaller, more compact and lighter than prior art dual valve designs, and makes installation easier due to fewer connections and elimination of certain mounting means needed for prior art designs.

It is still another object of the present invention to provide the single diverter valve that controls the air temperature of an aircraft cockpit and cabin by, for example, mixing the cooling air and the heating bypass air together.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the applicant has invented a diverter valve with a shutoff feature.

In a preferred embodiment for usage in a temperature control system for an aircraft ECS, the valve has a housing with an inlet connected to a source of air, such as a secondary power unit. The valve housing also has two outlets spaced 90° apart. A first outlet is coaxial, or "in-line", with the valve inlet, and is connected with an inlet of an ECS refrigeration pack. A second outlet is at a 90° angle with respect to each of the inlet and the first outlet. The second outlet is connected with a bypass line that bypasses the refrigeration pack and, instead, may be connected with a heater in the ECS.

Within the valve housing is disposed a hollow, ball-type, rotatable gate that comprises a sphere with two holes or orifices cut into the sphere surface, wherein the hole planes are parallel to each other. Source air flow can pass through the holes in the gate and into one or both outlets, depending upon the rotational position of the gate. The rotational gate position may be controlled by the ECS control system. In the alternative, the gate may be rotated to another position where no source air can flow into either outlet due to neither gate orifice being aligned with the inlet.

DETAILED DESCRIPTION OF THE PREFERRED EMBODIMENTS

Figure 1:
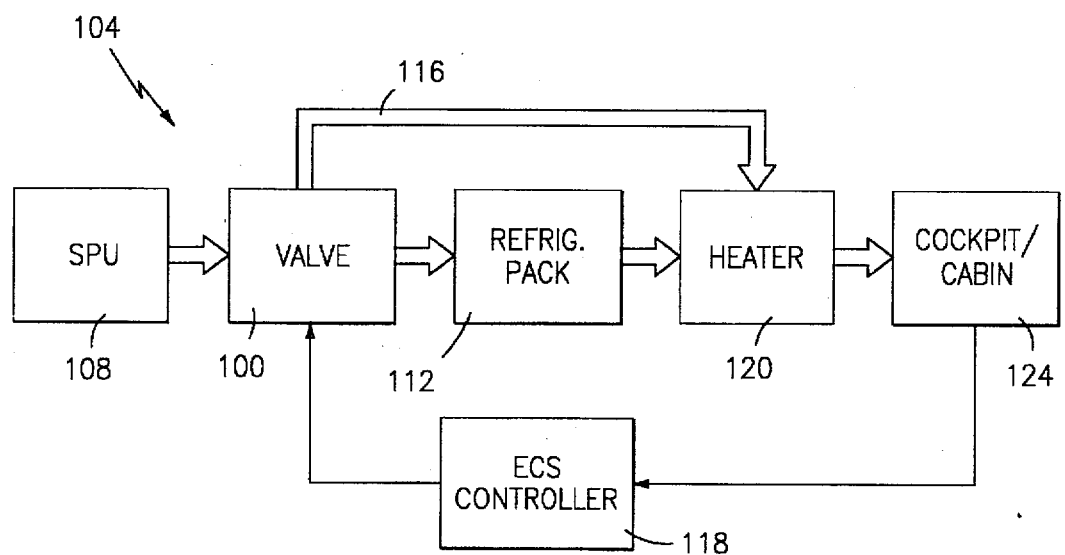
FIG. 1 is a block diagram illustration of a temperature control system for an aircraft utilizing the valve of the present invention.

Referring to the drawings in detail, a diverter valve in accordance with the present invention is described and illustrated therein and generally designated by the reference numeral 100. With specific reference to the block diagram of FIG. 1, there illustrated is the valve 100 as utilized in an exemplary embodiment of a temperature control system 104 for an aircraft. In such a system, high temperature compressed air is typically provided by an auxiliary or secondary power unit (SPU) 108. The air from the SPU 108 is fed to the valve 100 of the present invention, which then directs the flow of the compressed air to the remainder of the temperature control system 104. Typically, the temperature control system 104 also includes a refrigeration pack 112 for cooling the compressed air, together with a bypass line 116 that feeds the compressed air around the refrigeration pack 112 to a heater 120, for conditioning the air before passing it on to the cockpit and/or cabin 124 of the aircraft. The temperature of the cockpit/cabin is monitored by the ECS controller 118, which electrically governs the valve position to maintain the desired temperature. The temperature control system 104 may be somewhat similar in certain respects to that described and illustrated in U.S. Pat. No. 5,461,882, which is hereby incorporated by reference.

Figure 2:
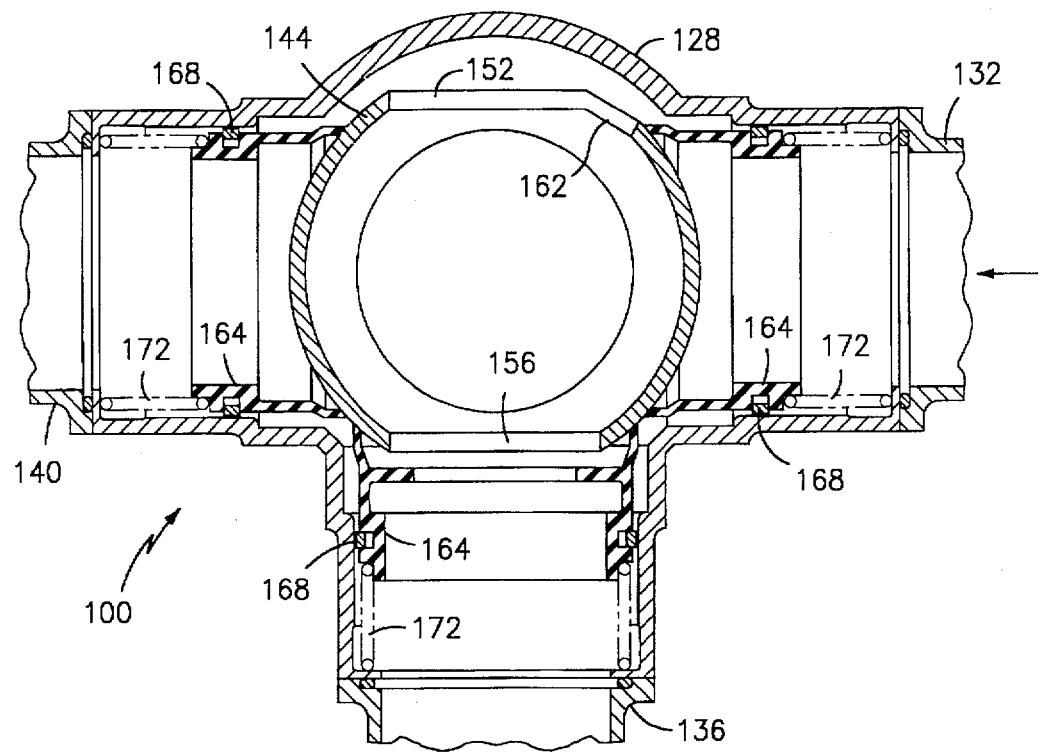
FIG. 2 is a cross-sectional illustration of the valve of the present invention shown in a fully closed position.
Figure 3:
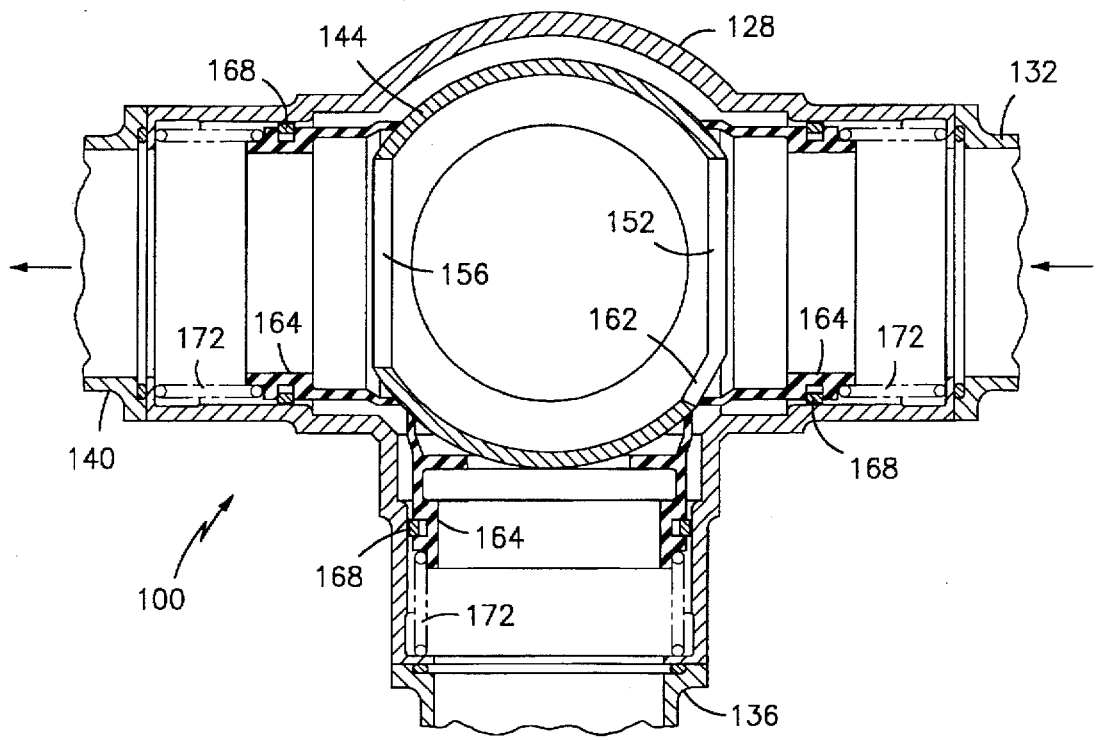
FIG. 3 is a cross-sectional illustration of the valve of FIG. 2 shown in a fully open position.
Figure 4:
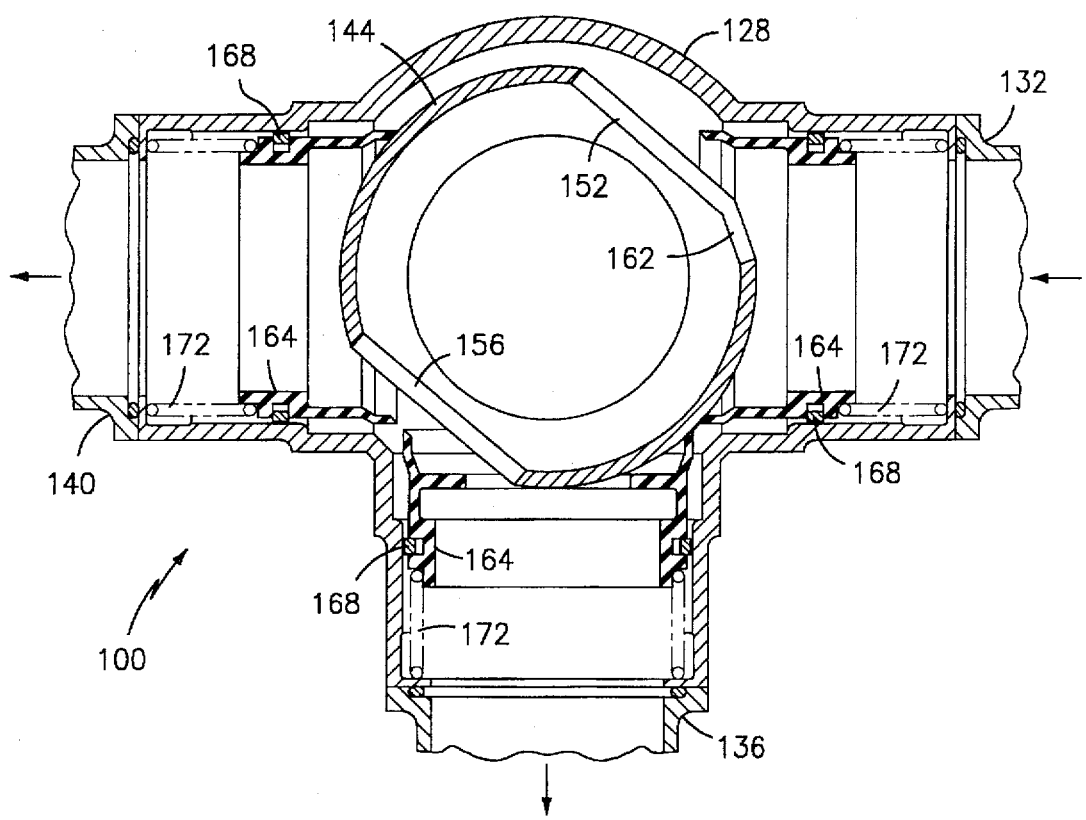
FIG. 4 is a cross-sectional illustration of the valve of FIGS. 2 and 3 shown in a partially open position.

Referring now to FIGS. 2–4, there illustrated are three cross-sectional views of the valve 100 of the present invention. The valve 100 comprises, in an exemplary embodiment, an aluminum housing 128 having an inlet 132 connected to the SPU 108. The valve also has a first outlet 136 (i.e., bypass outlet) connected to the bypass line 116, and a second outlet 140 (i.e., cooling outlet) connected to the refrigeration pack 112. The valve inlet 132 is aligned, or co-axial, with the second valve outlet 140. Also, the first valve outlet 136 is disposed at a 90° angle with respect to both the valve inlet 132 and the second valve outlet 140.

Figure 5:
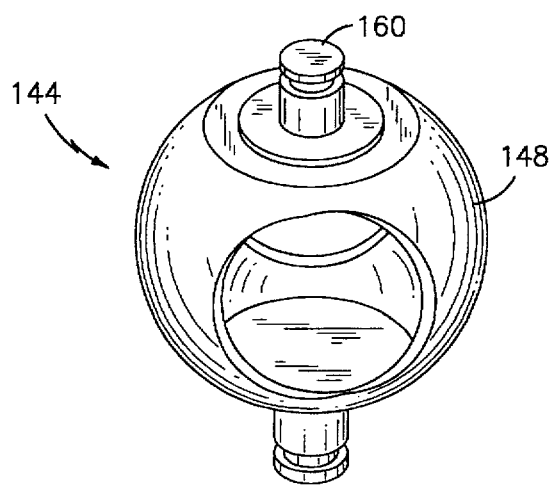
FIG. 5 is a perspective view of the gate portion of the valve of FIGS. 1–4.

The valve 100 also contains a gate 144 located internal to the valve housing and also formed of aluminum. As seen in better detail in FIG. 5, the gate 144 has a spherical-shaped sidewall 148, flat top and bottom surfaces, and a hollow inside. First and second holes or orifices 152, 156 are formed in the gate sidewall 148. In a preferred embodiment, both orifices 152, 156 are formed as planar "cuts" that are in parallel planes to each other. Also, in a preferred embodiment, the diameters of the two orifices are equal. However, for reasons that will become apparent hereinafter, the first or input orifice 152 is somewhat elongated at one end (relative to the second orifice 156) by having a portion of the orifice 152 being cut in a plane that is at an angle with respect to the parallel plane that makes up the majority of the input orifice 152.

The gate 144 is mounted inside the housing 128 using bushings (not shown). The gate 144 is rotatable over a 90° range of motion, in a preferred embodiment. Rotation of the gate may be controlled in a known manner by the ECS controller 118 of FIG. 1 through appropriate mechanical or pneumatic actuation of the gate by connection to a stem 160 emanating from both the top and bottom surfaces of gate 144. Also, in a preferred embodiment, the valve inlet 132 and the second valve outlet 140 both have a diameter of two inches, while the first valve outlet has a diameter of 1.5 inches.

The valve inlet 132, the first valve outlet 136 and the second valve outlet 140 each have mounted therein a gate seal 164, and an associated seal ring 168 and a compression spring 172. These cylindrical seals 164 are used to control the flow of air through the orifices 152, 156 in the gate 144. No air flow is allowed to pass through the gate 144 unless it is directed through the seals 164. The seals 164 are spring-loaded to maintain contact with the gate 144 under all operating conditions. The seal 164 and the seal ring 168 may comprise a plastic material, such as that provided by DuPont and marketed under trademark Vespel®.

Figure 6:
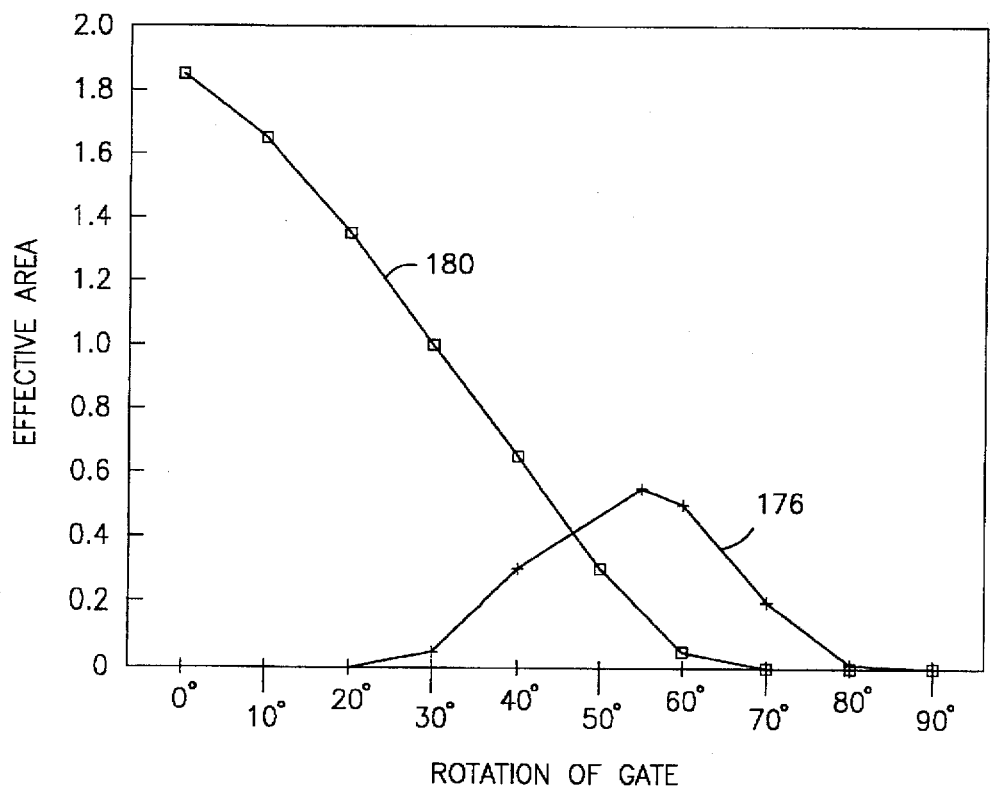
FIG. 6 is a graph illustrating the relationship between the effective area of the openings in the gate versus angular rotational position of the gate.

Referring back to FIG. 2, there illustrated is a rotational position of the gate 144 within the valve housing 128 such that no inlet air flow is allowed to pass through either the first or second valve outlets 136, 140. With reference also to FIG. 6, this fully-closed valve position corresponds to the graph of FIG. 6 where the rotation of the gate 144 is at 90°. FIG. 6 illustrates valve airflow schedule in terms of effective area versus angular gate rotation for both the first valve outlet 136 and the second valve outlet 140. The first valve outlet 136 is illustrated by the graph designated by the reference numeral 176. The second valve outlet 140 is illustrated by the curve of FIG. 6 designated by the reference numeral 180. FIG. 2 illustrates the fully-closed position of the gate 144 that corresponds to the 90° angular rotation of the gate position on the graph of FIG. 6. From FIG. 6, it can be seen that, at 90° angular gate rotation, there is no air flow through the inlet 132 to either of the first or second outlets 136, 140. This is because the gate has blocked all flow from going beyond the inlet 132.

FIG. 3, on the other hand, illustrates a fully-opened position of the gate 144 within the valve housing 128 such that all of the air flow passes through the inlet 132 and through both the first and second orifices 152, 156 in the gate 144 and on to the second outlet 140 to the refrigeration pack 112. This is illustrated in FIG. 6 at the 0° angular gate rotation position. From the curve 180 of FIG. 6, it can be seen that the effective valve area for the second outlet 140 is at a maximum, while from the curve 176 the effective valve area for the first outlet 136 is at a minimum. The net effective area of the gate for the second outlet 140 is a known mathematical function of the combination of the area of the inlet 132 and the area of the second outlet 140. On the other hand, the net effective area of the first or bypass outlet 136 is a similar known mathematical function of the combination of the area of the inlet 132 and the area of the first outlet 136.

In contrast, FIG. 4 illustrates a 45° angular gate rotational position in which a portion of the air flowing into the inlet 132 goes into both the first and second outlets 136, 140. This is the approximate intersection point of the two curves 176, 180 of the graph of FIG. 6.

From the figures it can be seen that inlet air flows through the orifices 152, 156 in the gate 144, wherein these orifices are sized to yield the proper flow area versus valve angle for any particular embodiment. At a valve angle of 0° (FIG. 3), the air flow through the valve 100 is straight through the housing 128 and the gate 144, thereby providing full cooling flow of the inlet air to the refrigeration pack 112. There is no bypass flow at this position.

As the gate is rotated counter-clockwise with respect to FIGS. 2–4, the valve angle of rotation increases from 0°, thereby decreasing the cooling flow to the second outlet 140. At an angle of 20° of counter-clockwise gate rotation, the second orifice 156 in the gate 144 allows some of the inlet flow to pass into the first outlet 136. Up until this angle of 20°, there is no bypass flow. Thus, some refrigeration pack cooling flow throttling is allowed between 0° and 20° of counter-clockwise gate rotation.

As the valve angle continues to increase with increasing counter-clockwise gate rotation, the flow into the second or cooling outlet 140 continues to decrease, whereas the flow into the first or bypass outlet 136 continues to increase, providing temperature control illustrated in the graph of FIG. 6. With increasing gate rotation in a counter-clockwise rotation, a full bypass condition is reached at a valve angle of approximately 55°. Then, at approximately 70°, the flow to the second or cooling valve outlet 140 is shut off and there is only a small amount of flow to the first or bypass outlet 136. At a valve angle of 80°, the valve is essentially closed, and there is no flow from the inlet 132 to either of the first or second outlets 136, 140. The valve is essentially "shut-off" between valve angles of 80° and 90°.

However, upon clockwise rotation of the gate 144 starting from the fully-closed position of FIG. 2, it can be seen that the portion 162 of the first orifice 152 that is angled with respect to the major parallel plane of that orifice 152 allows for the characteristic curve 176 of FIG. 6 wherein there is air flow to only the first outlet 136 between valve angles of 80° and 70°. Thus, this angled portion 162 selectively allows airflow to one but not both outlets. TABLE 1 gives representative effective areas of the inlet 132, the first or bypass outlet 136, and the second or cooling outlet 140.

TABLE 1

VALVE FLOW AREAS

| VALVE ANGLE | COOLING OUTLET AREA (IN$^2$) | BYPASS OUTLET AREA (IN$^2$) | INLET AREA (IN$^2$) |
|---|---|---|---|
| 0.0° | 2.600 | 0.000 | 2.600 |
| 10.0° | 2.507 | 0.000 | 2.600 |
| 20.0° | 2.030 | 0.061 | 2.193 |
| 30.0° | 1.510 | 0.061 | 1.704 |
| 40.0° | 1.012 | 0.124 | 1.215 |
| 50.0° | 0.577 | 0.372 | 0.761 |
| 60.0° | 0.238 | 0.706 | 0.377 |
| 70.0° | 0.028 | 1.070 | 0.099 |
| 80.0° | 0.000 | 1.327 | 0.000 |
| 90.0° | 0.000 | 1.327 | 0.000 |

It should be understood from the foregoing that merely an exemplary embodiment of the valve of the present invention has been disclosed for usage with the temperature control system 104 for an aircraft. The valve 100 of the present invention finds numerous and countless other usages in many other different types of industries. Also, it should be understood by those of ordinary skill in the art that the 90° range of valve rotation is purely exemplary. Instead, the amount of rotation can be either greater than or less than 90°, depending upon the particular application.

Further, it should be understood that providing a hollow gate with two orifices formed therein, wherein one of the orifices is elongated and has an angled portion with respect to the major plane of the orifice, are all purely exemplary. Still further, the sizes and areas of the inlet and outlet openings, together with the materials comprising all of the components, are all purely exemplary.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. An environmental control system, comprising:
   a. a source of air;
   b. a refrigeration package for selectively cooling the air from the source of air;
   c. a bypass line for transporting a selective portion of the air from the source of air around the refrigeration package;
   d. a valve for selectively connecting, depending upon a position of a movable valve element in a sequence of a plurality of positions, wherein the valve element is in the form of a gate rotatable over an angular range of motion having a maximum range of 90°, the air from the source of air solely to the refrigeration pack when the valve element is in a first position in the sequence of positions, to both the refrigeration pack and the bypass line when the valve element is in a second position in the sequence of positions, to solely the bypass line when the valve element is in a third position in the sequence of positions, and to neither the refrigeration pack nor the bypass line when the valve element is in a fourth position in the sequence of positions; and
   e. a controller for monitoring an output temperature of air from the environmental control system and for controlling the position of the movable valve element in response thereto.

2. The environmental control system of claim 1, wherein the movable valve element comprises a gate that is rotatable over a predetermined angular range of motion, the gate having at least two orifices formed therein to allow the air from the source of air to flow through the orifices when the orifices are aligned with a valve inlet and at least one of the two valve outlets, the valve inlet being connected with the source of air, a second one of the valve outlets being connected with the refrigeration pack, a first one of the valve outlets being connected with the bypass line.

3. The environmental control system of claim 2, wherein the gate is rotatable over a maximum of a 90° angular range of motion, in the first position in the sequence of positions and during a first portion of the gate rotation range of motion the gate connects the air from the source of air to solely the second one of the two valve outlets wherein an amount of the air flowing from the source of air to the refrigeration pack is determined by an area of the gate orifice exposed to the inlet connected to the source of air and an area of the gate orifice exposed to the second outlet connected to the refrigeration pack, in the second position in the sequence of positions and during a second portion of the gate rotation range of motion the gate connects the air from the source of air to both the first valve outlet and the second valve outlet wherein an amount of air flowing from the source of air to the refrigeration pack and to the bypass line is determined by the area of the gate orifice exposed to the inlet to the source of air and to the area of the gate orifice exposed to the second outlet connected to the refrigeration pack and to an area of the gate orifice exposed to the first outlet connected to the bypass line, in the third position in the sequence of positions and during a third portion of the gate rotation range of motion the gate connects the air from the source of air to solely the first outlet wherein an amount of air flowing from the source of air to the bypass line is determined by the area of the gate orifice exposed to the inlet connected to the source of air and the area of the gate orifice exposed to the first outlet connected to the bypass line, in a fourth position in the sequence of positions and during a fourth portion of the gate rotation range of motion the gate does not connect the air from the source of air to either the first valve outer or the second valve outlet.

4. The environmental control system of claim 2, wherein the first portion of the gate rotation range of motion is from approximately 0° to 20°, wherein the second portion of the gate rotation range of motion is from approximately 20° to 70°, wherein the third portion of the gate rotation range of motion is from 70° to 80°, and wherein the fourth portion of the gate rotation range of motion is from approximately 80° to 90°.

5. The environmental control system of claim 1, wherein the valve further comprises a housing, the movable valve element comprising a spherical gate disposed within the housing, the housing having an inlet connected with the source of air, the housing having a second housing outlet connected with the refrigeration package, and the housing having a first outlet connected with the bypass line.

6. The environmental control system of claim 1, wherein each of the housing inlet, the first housing outlet and the second housing outlet has a spring-loaded fluid seal that interfaces with the gate.

7. A valve comprising:
   a. a housing;
   b. a movable gate disposed within the housing;
   c. an inlet formed in the housing;
   d. a first outlet formed in the housing; and
   e. a second outlet formed in the housing, wherein the gate is movable in a rotational direction over a predetermined angular range of rotation having a maximum range of 90° in a sequence of positions over a predetermined range of positions, when the gate is movable in a first rotational direction a first position in the sequence of positions being where the inlet is connected with solely the second outlet, a second position in the sequence of positions being where the inlet is connected with both the first outlet and the second outlet, a third position in the sequence of positions being where the inlet is connected to solely the first outlet, and a fourth position in the sequence of positions being where the inlet is connected with neither the first outlet nor the second outlet, wherein when the gate is movable in a second rotational direction that is opposite in direction of the first rotational direction, the sequence of positions is the fourth position followed by the third position, the second position and the first position.

8. The valve of claim 1, wherein the second outlet is disposed at a first end of the predetermined angular range of rotation of the gate, and wherein the first outlet is disposed at an angular range of rotation that is less than the first end of the predetermined angular range of rotation of the gate.

9. The valve of claim 1, wherein a center axis of the inlet is coaxial with a center axis of the second outlet.

10. The valve of claim 7, wherein the gate has at least two orifices formed therein to allow fluid to flow therethrough.

11. The valve of claim 10, wherein the gate is generally spherical in a shape of its side wall, and wherein each one of the at least two orifices is formed in a plane that is parallel to all of the other planes of the other ones of the at least two orifices.

12. The valve of claim 1, wherein the inlet is connected with air from a source of air, the second outlet is connected with a device for cooling the air from the source of air, and the first outlet is connected with a bypass line that bypasses the device for cooling the air from the source.

13. The valve of claim 1, wherein the gate is movable in a rotational direction over a 90° angular range of rotation, the gate having at least two orifices formed therein, the gate comprising means for allowing air from the source of air connected to the inlet to flow through the gate and solely through the second outlet in varying quantities when the gate is at any one of a first plurality of angular positions in the sequence of positions, for allowing air from the source of air to flow through the gate and to both the first and second outlets in varying quantities when the gate is at any one of a second plurality of angular positions in the sequence of positions, for allowing air from the source of air to flow through the gate and solely to the first outlet in varying quantities when the gate is at any one of a third plurality of angular positions in the sequence of positions, and for disallowing air from the source of air to flow to neither the first nor second outlet when the gate is at any one of a fourth plurality of angular positions in the sequence of positions.

14. The valve of claim 12, wherein each one of the at least two orifices formed in the gate is a planar orifice whose plane is parallel to the planes formed in all of the other ones of the at least two orifices.

15. The valve of claim 13, wherein the orifice that is rotatably positioned in the vicinity of the inlet to allow the air from the service to flow through the gate has an orifice portion that is formed in a plane that is at an angle to the parallel plane of the orifice.

* * * * *